United States Patent
Boek et al.

(10) Patent No.: US 10,570,055 B2
(45) Date of Patent: Feb. 25, 2020

(54) ARTICLE WITH GLASS LAYER AND GLASS-CERAMIC LAYER AND METHOD OF MAKING THE ARTICLE

(71) Applicant: CORNING INCORPORATED, Corning, NY (US)

(72) Inventors: Heather Debra Boek, Corning, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/273,867

(22) Filed: Feb. 12, 2019

(65) Prior Publication Data
US 2019/0185371 A1 Jun. 20, 2019

Related U.S. Application Data

(62) Division of application No. 14/432,067, filed as application No. PCT/US2013/063400 on Oct. 4, 2013, now abandoned.
(Continued)

(51) Int. Cl.
*B32B 15/04* (2006.01)
*B32B 17/06* (2006.01)
(Continued)

(52) U.S. Cl.
CPC .......... *C03C 10/0018* (2013.01); *B32B 17/06* (2013.01); *C03C 3/083* (2013.01);
(Continued)

(58) Field of Classification Search
USPC .................. 428/426, 428, 432, 688
See application file for complete search history.

(56) References Cited

U.S. PATENT DOCUMENTS 3,253,975 A * 5/1966 Olcott ................. C03C 10/0027
428/410
3,282,770 A * 11/1966 Stookey .............. C03C 10/0018
428/410
(Continued)

FOREIGN PATENT DOCUMENTS

GB 1380781 A 1/1975
GB 1509644 A 5/1978
(Continued)

OTHER PUBLICATIONS

English Translation of CN201380052295.0 Notice of First Office Action dated Oct. 9, 2016; 12 Pages; Chinese Patent Office.
(Continued)

*Primary Examiner* — Lauren R Colgan
(74) *Attorney, Agent, or Firm* — Michael A. Hood; Svetlana Z. Short

(57) ABSTRACT

A glass-ceramic composition is disclosed herein including: from about 60 mol. % to less than 72.0 mol. % SiO2; from about 10 mol. % to about 17 mol. % Al2O3; from about 3 mol. % to about 15 mol. % Na2O; from about 1 mol. % to about 8 mol. % Li2O; and from about 3 mol. % to about 7 mol. % TiO2. The glass-ceramic composition can be used to form one, two, or more, cladding layers of a laminated glass article, wherein the layer(s) of glass-ceramics material can be cerammed to form one or more glass layers.

8 Claims, 1 Drawing Sheet

Related U.S. Application Data

(60) Provisional application No. 61/744,848, filed on Oct. 4, 2012.

(51) Int. Cl.
  *C03C 10/00* (2006.01)
  *C03C 3/083* (2006.01)
  *C03C 3/085* (2006.01)

(52) U.S. Cl.
  CPC .......... *C03C 3/085* (2013.01); *C03C 10/0027* (2013.01); *C03C 10/0045* (2013.01); *B32B 2315/02* (2013.01); *B32B 2315/08* (2013.01); *B32B 2419/00* (2013.01); *B32B 2457/12* (2013.01); *B32B 2457/208* (2013.01); *B32B 2509/00* (2013.01); *B32B 2605/006* (2013.01)

(56) References Cited

U.S. PATENT DOCUMENTS

| | | | |
|---|---|---|---|
| 3,490,984 A * | 1/1970 | Petticrew | C03C 10/0027 428/410 |
| 3,597,305 A | 8/1971 | Giffen | |
| 3,633,193 A | 1/1972 | Milo | |
| 3,637,453 A | 1/1972 | Simmons | |
| 3,673,049 A * | 6/1972 | Giffen | C03B 17/02 428/213 |
| 3,737,294 A | 6/1973 | Dumbaugh et al. | |
| 3,746,526 A | 7/1973 | Giffon | |
| 3,779,856 A * | 12/1973 | Pirooz | B32B 17/06 428/336 |
| 3,849,097 A * | 11/1974 | Giffen | C03C 10/00 65/33.5 |
| 3,854,919 A * | 12/1974 | Pirooz | B32B 17/06 65/32.3 |
| 3,907,577 A * | 9/1975 | Kiefer | C03C 10/0027 501/4 |
| 3,931,438 A * | 1/1976 | Beall | C03B 17/02 428/218 |
| 3,990,877 A * | 11/1976 | Simmons | C03C 10/00 65/30.14 |
| 3,992,179 A * | 11/1976 | Simmons | C03C 10/00 65/30.14 |
| 4,093,468 A | 6/1978 | Boitel et al. | |
| 4,102,664 A | 7/1978 | Dumbaugh | |
| 4,130,680 A | 12/1978 | Ference et al. | |
| 4,148,661 A | 4/1979 | Kerko et al. | |
| 4,172,921 A * | 10/1979 | Kiefer | C03B 27/00 428/410 |
| 4,212,678 A | 7/1980 | Chyung et al. | |
| 4,214,886 A | 7/1980 | Shay et al. | |
| 4,341,543 A * | 7/1982 | Andrus | C03C 23/00 65/30.1 |
| 4,405,672 A | 9/1983 | Araujo et al. | |
| 4,455,160 A | 6/1984 | Rittler | |
| 4,457,771 A * | 7/1984 | Ambrogi | C03B 5/12 264/148 |
| 4,480,044 A | 10/1984 | McAlinn | |
| 4,486,213 A | 12/1984 | Lentz et al. | |
| 4,726,981 A * | 2/1988 | Pierson | C03C 10/0027 428/212 |
| 4,814,297 A * | 3/1989 | Beall | C03C 10/0036 501/7 |
| 5,084,328 A * | 1/1992 | Fine | C03C 10/0045 428/212 |
| 5,173,453 A * | 12/1992 | Beall | C03C 10/0027 501/4 |
| 5,212,122 A | 5/1993 | Pannhorst et al. | |
| 5,342,426 A | 8/1994 | Dumbaugh, Jr. | |
| 5,411,563 A | 5/1995 | Yeh et al. | |
| 5,422,318 A | 6/1995 | Hagg et al. | |
| 5,559,060 A | 9/1996 | Dumbaugh, Jr. et al. | |
| 5,691,256 A | 11/1997 | Taguchi et al. | |
| 5,723,945 A | 3/1998 | Schermerhorn | |
| 6,436,859 B1 * | 8/2002 | Muramoto | C03C 3/083 501/69 |
| 6,472,338 B1 * | 10/2002 | Shimatani | C03C 1/004 501/4 |
| 6,515,263 B2 * | 2/2003 | Mitra | C03C 10/0027 219/443.1 |
| 6,660,669 B2 * | 12/2003 | Beall | C03C 4/0071 501/37 |
| 6,677,046 B2 | 1/2004 | Hachitani et al. | |
| 7,201,965 B2 | 4/2007 | Gulati et al. | |
| 7,382,541 B2 | 6/2008 | Inoue et al. | |
| 7,465,686 B2 | 12/2008 | Comte | |
| 7,479,949 B2 | 1/2009 | Jobs et al. | |
| 7,514,149 B2 * | 4/2009 | Bocko | B32B 17/06 428/426 |
| 7,635,521 B2 | 12/2009 | Aitken et al. | |
| 7,829,489 B2 | 11/2010 | Borrelli et al. | |
| 7,981,823 B2 * | 7/2011 | Siebers | C03C 3/095 428/428 |
| 8,007,913 B2 * | 8/2011 | Coppola | B32B 17/06 428/426 |
| 8,252,708 B2 * | 8/2012 | Morena | C03C 8/02 501/25 |
| 8,257,831 B2 * | 9/2012 | Yagi | C03C 3/083 428/426 |
| 8,309,480 B2 * | 11/2012 | Fujisawa | C03C 3/085 501/4 |
| 9,126,859 B2 * | 9/2015 | Nakane | C03C 10/0054 |
| 9,133,054 B2 * | 9/2015 | Beall | C03C 14/00 |
| 9,346,699 B2 * | 5/2016 | Amosov | C03B 17/02 |
| 9,346,705 B2 * | 5/2016 | Kiczenski | B32B 17/00 |
| 9,393,760 B2 * | 7/2016 | He | C03C 14/00 |
| 9,434,632 B2 * | 9/2016 | Amosov | C03B 17/064 |
| 9,434,633 B2 * | 9/2016 | Bookbinder | C03B 17/02 |
| 9,458,044 B2 * | 10/2016 | Bisson | C03B 17/02 |
| 9,522,836 B2 * | 12/2016 | Gulati | C03C 3/091 |
| 9,902,138 B2 * | 2/2018 | Edwards | H01L 51/524 |
| 2001/0051583 A1 | 12/2001 | Negate et al. | |
| 2002/0183187 A1 * | 12/2002 | Siebers | C03B 11/10 501/4 |
| 2004/0072669 A1 * | 4/2004 | Beall | C03C 4/0071 501/37 |
| 2004/0121893 A1 * | 6/2004 | Minamikawa | C03C 10/0045 501/4 |
| 2004/0197575 A1 | 10/2004 | Bocko et al. | |
| 2006/0127679 A1 * | 6/2006 | Gulati | B32B 17/06 428/426 |
| 2007/0149379 A1 | 6/2007 | Hsu et al. | |
| 2007/0190340 A1 * | 8/2007 | Coppola | B32B 17/06 428/432 |
| 2007/0213192 A1 * | 9/2007 | Comte | C03C 10/0027 501/7 |
| 2008/0026927 A1 * | 1/2008 | Comte | C03C 1/004 501/7 |
| 2008/0062148 A1 | 3/2008 | Hotelling et al. | |
| 2008/0143690 A1 | 6/2008 | Jang et al. | |
| 2009/0142568 A1 | 6/2009 | Dejneka et al. | |
| 2010/0224619 A1 * | 9/2010 | Schoenberger | C03C 1/004 219/443.1 |
| 2010/0304948 A1 | 12/2010 | Comte et al. | |
| 2011/0017297 A1 * | 1/2011 | Aitken | C03C 3/085 136/260 |
| 2011/0092353 A1 * | 4/2011 | Amin | C03C 3/083 501/3 |
| 2011/0200805 A1 * | 8/2011 | Tomamoto | C03B 23/037 428/213 |
| 2011/0217657 A1 | 9/2011 | Flemming et al. | |
| 2012/0135848 A1 * | 5/2012 | Beall | C03C 10/0027 501/32 |
| 2014/0141217 A1 * | 5/2014 | Gulati | C03C 3/091 428/212 |
| 2014/0238078 A1 * | 8/2014 | Boek | C03C 15/00 65/30.14 |
| 2015/0030827 A1 * | 1/2015 | Gomez | C03C 21/002 428/212 |

(56) References Cited

U.S. PATENT DOCUMENTS

| | | | | | |
|---|---|---|---|---|---|
| 2015/0037552 | A1* | 2/2015 | Mauro | ............... | C03C 3/089 |
| | | | | | 428/212 |
| 2015/0251383 | A1* | 9/2015 | Beall | ............... | C03B 17/02 |
| | | | | | 428/428 |
| 2017/0226000 | A1* | 8/2017 | Kiczenski | ............... | C03C 3/093 |

FOREIGN PATENT DOCUMENTS

| GB | 2315266 A | 1/1998 |
|---|---|---|
| JP | 62246840 A | 10/1987 |
| JP | 63151647 A | 6/1988 |
| JP | 346308 A | 2/1991 |
| JP | 3036781 A | 2/1991 |
| JP | 3242348 A | 10/1991 |
| JP | 05009039 A | 1/1993 |
| JP | 2000178036 | 6/2000 |
| JP | 2002321940 A | 11/2002 |
| JP | 2009114005 A | 5/2009 |
| WO | 2007146785 A2 | 12/2007 |
| WO | 2008150355 A1 | 12/2008 |
| WO | 2012005941 A1 | 1/2012 |
| WO | 2013130718 A1 | 9/2013 |
| WO | 2013155281 A1 | 10/2013 |

OTHER PUBLICATIONS

International Search Report and Written Opinion of the International Searching Authority; PCT/US2013/063400; dated Feb. 5, 2014; 12 Pages; European Patent Office.

JP2015535811 Office Action dated Sep. 5, 2017, Japan Patent Office.

TW102136789 Search Report dated Dec. 2, 2016, Taiwan Patent Office.

EP13782880.2 Office Action dated Jul. 19, 2018, European Patent Office.

* cited by examiner

ARTICLE WITH GLASS LAYER AND GLASS-CERAMIC LAYER AND METHOD OF MAKING THE ARTICLE

This application is a divisional of U.S. application Ser. No. 14/432,067, filed on Mar. 27, 2015, which claims the benefit of priority under 35 U.S.C. § 371 of International Application No. PCT/US2013/063400, filed on Oct. 4, 2013, which claims the benefit of priority under 35 U.S.C. § 119 of U.S. Provisional Application Ser. No. 61/744,848, filed on Oct. 4, 2012, the content of each of which is relied upon and incorporated herein by reference in its entirety.

BACKGROUND

Field

The present specification generally relates to articles comprised of a glass layer and a glass-ceramic layer and, more specifically, to laminated articles comprising a glass core sandwiched between first and second clad layers, at least one of the clad layers being comprised of a glass-ceramic composition.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

SUMMARY

According to embodiments disclosed herein, a glass article comprises a glass core layer disposed between a first glass cladding layer and a second glass cladding layer. In some of these embodiments, the core glass has a first surface and a second surface opposite the first surface, where the first glass cladding layer is be fused to the first surface of the glass core layer and a second glass cladding layer is be fused to the second surface of the glass core layer. In other embodiments, a first diffusive glass layer is disposed between the glass core layer and the first glass cladding layer; additionally a second diffusive glass layer is be disposed between the glass core layer and the second glass cladding layer; these diffusive layers may be formed during, for example, the fusion forming process.

In some embodiments, the first glass cladding layer and the second glass cladding layer are formed from a glass-ceramic composition which comprises from about 64 mol. % to about 72 mol. % $SiO_2$; from about 11 mol. % to about 16 mol. % $Al_2O_3$; from about 4 mol. % to about 13 mol. % $Na_2O$; from about 2 mol. % to about 7 mol. % $Li_2O$; and from about 4 mol. % to about 6 mol. % $TiO_2$. The glass composition may further comprise from about 0.1 mol. % to about 5 mol. % alkaline earth oxide. The alkaline earth oxide comprises at least MgO. The MgO may be present in the glass composition in a concentration from about 0.5 mol. % to about 2 mol. %.

According to one set of embodiments, a glass-ceramic composition is disclosed herein comprising: from about 60 mol. % to less than 72.0 mol. % SiO2; from about 10 mol. % to about 17 mol. % Al2O3; from about 3 mol. % to about 15 mol. % Na2O; from about 1 mol. % to about 8 mol. % Li2O; and from about 3 mol. % to about 7 mol. % TiO2. The glass-ceramic composition can be used to form one, two, or more, cladding layers of a laminated glass article, wherein the layer(s) of glass-ceramics material can be cerammed to form one or more glass layers.

According to another set of embodiments, a glass-ceramic composition for the skin, or clad, layer(s) may comprise from about 64 mol. % to less than 72.0 mol. % $SiO_2$; from about 11 mol. % to about 16 mol. % $Al_2O_3$; from about 4 mol. % to about 13 mol. % $Na_2O$; from about 2 mol. % to about 7 mol. % $Li_2O$; and from about 4 mol. % to about 6 mol. % $TiO_2$ as glass-ceramic network formers. The glass composition may further comprise from about 0.1 mol. % to about 5 mol. % alkaline earth oxide. In some embodiments, the alkaline earth oxide comprises at least MgO. The MgO may be present in the glass composition in a concentration from about 0.5 mol. % to about 2 mol. %. In some embodiments, the glass-ceramic composition has a liquidus in the range of greater than about 20,000 poise, and in some embodiments greater than about 25,000 poise and in some embodiments greater than about 28,000 poise. The glass-ceramic composition has, before ceramming, a coefficient of thermal expansion (CTE) of from about $35 \times 10^{-7}$ to about $80 \times 10^{-7}$, and in some embodiments from about $40 \times 10^{-7}$ to about $72 \times 10^{-7}$; in some embodiments, the glass composition of the glass core will have a corresponding coefficient of thermal expansion. The glass-ceramic composition has, after ceramming, a coefficient of thermal expansion of from about $5 \times 10^{-7}$ to about $25 \times 10^{-7}$, and in some embodiments from about $10 \times 10^{-7}$ to about $20 \times 10^{-7}$. The net CTE difference then between the final clad (skin) composition, after ceramming, and the core will be in the range of about $20 \times 10^{-7}$ to $62 \times 10^{-7}$. Thus, the possible CTE difference between the final skin/clad composition and the glass core can be higher than that achieved using glass pairs alone. For example, a core glass with a CTE of $90 \times 10^{-7}$ (such as glass code 2317) could be utilized with a skin as one of the glass ceramic compositions with, e.g., a pre-ceram CTE of $70 \times 10^{-7}$; this combination can be cut on the draw tower, then the outer skin cerammed to, e.g., a CTE of 5 to $20 \times 10^{-7}$, resulting in a final CTE difference between the skin and core of about 70 to $85 \times 10^{-7}$, which can be much higher than known capabilities of glass compositions alone, resulting in higher compressive stress as well. In some embodiments, glass ceramic materials can have negative CTE, and therefore a very high CTE difference between the core and skin can be achieved using the glass ceramic clad. In some embodiments, a difference between the CTE of the core and the clad layers is less than $5 \times 10^{-7}/C$ when the core and clad layers are in a molten or viscous state.

The glass-ceramic compositions are particularly well suited for use as glass-ceramic cladding layers in laminated glass articles, such as laminated glass articles formed by the fusion lamination process.

Additional features and advantages of the glass compositions and glass articles formed from the glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
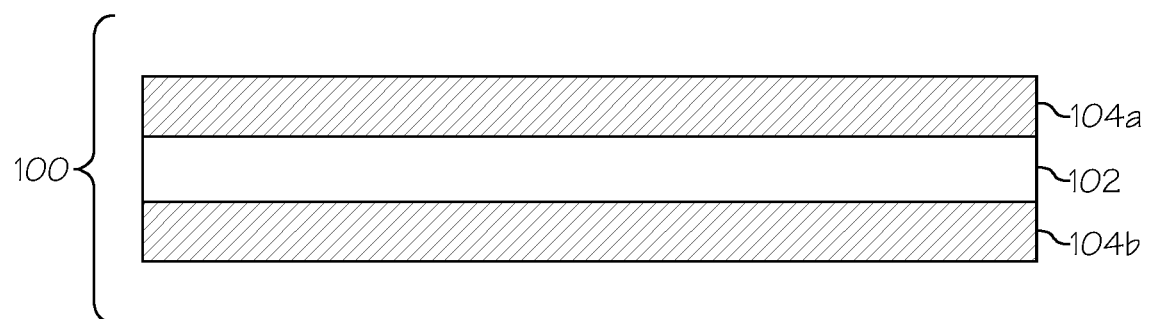
FIG. 1 schematically depicts a cross section of a laminated glass article according to one or more embodiments shown and described herein.

Reference will now be made in detail to embodiments of glass-ceramic compositions disclosed herein and articles incorporating the same, examples of which are illustrated in the accompanying drawings. Whenever possible, the same reference numerals will be used throughout the drawings to refer to the same or like parts. The glass ceramic compositions described herein may be utilized in conjunction with core glass compositions to produce laminated glass articles which are compressively stressed without being ion-exchanged. In some embodiments, a difference between the CTE of the core and the clad layers is less than $5 \times 10^{-7}$/C when the core and the clad layers are in a molten or viscous state.

In one set of embodiments, a glass-ceramic composition for the skin, or clad, layer(s) comprises from about 64 mol. % to less than 72.0 mol. % $SiO_2$; from about 11 mol. % to about 16 mol. % $Al_2O_3$; from about 4 mol. % to about 13 mol. % $Na_2O$; from about 2 mol. % to about 7 mol. % $Li_2O$; and from about 4 mol. % to about 6 mol. % $TiO_2$ as glass-ceramic network formers. The glass composition may further comprise from about 0.1 mol. % to about 5 mol. % alkaline earth oxide. The alkaline earth oxide comprises at least MgO. The MgO may be present in the glass composition in a concentration from about 0.5 mol. % to about 2 mol. %. In some embodiments, the glass-ceramic composition has a liquidus in the range of greater than about 20,000 poise, and in some embodiments greater than about 25,000 poise and in some embodiments greater than about 28,000 poise. The glass-ceramic composition has, before ceramming, a coefficient of thermal expansion (CTE) of from about $35 \times 10^{-7}$ to about $80 \times 10^{-7}$, and in some embodiments from about $40 \times 10^{-7}$ to about $72 \times 10^{-7}$; in some embodiments, the glass composition of the glass core will have a corresponding coefficient of thermal expansion. The glass-ceramic composition has, after ceramming, a coefficient of thermal expansion of from about $5 \times 10^{-7}$ to about $25 \times 10^{-7}$, and in some embodiments from about $10 \times 10^{-7}$ to about $20 \times 10^{-7}$. The net CTE difference then between the final clad (skin) composition, after ceramming, and the core will be in the range of about $20 \times 10^{-7}$ to $62 \times 10^{-7}$. Thus, the possible CTE difference between the final skin/clad composition and the glass core can be higher than that achieved using glass pairs alone. For example, a core glass with a CTE of $90 \times 10^{-7}$ (such as glass code 2317) could be utilized with a skin as one of the glass ceramic compositions with, e.g., a pre-ceram CTE of $70 \times 10^{-7}$; this combination can be cut on the draw tower, then the outer skin cerammed to, e.g., a CTE of 5 to $20 \times 10^{-7}$, resulting in a final CTE difference between the skin and core of about 70 to $85 \times 10^{-7}$, which can be much higher than known capabilities of glass compositions alone, resulting in higher compressive stress as well. In some embodiments, glass ceramic materials can have negative CTE, and therefore a very high CTE difference between the core and skin can be achieved using the glass ceramic clad. In some embodiments, a difference between the CTE of the core and the clad layers is less than $5 \times 10^{-7}$/C when the core and clad layers are in a molten or viscous state. The glass compositions and glass articles formed from the glass compositions will be described in more detail herein with specific reference to the appended drawings.

The term "liquidus viscosity," as used herein, refers to the shear viscosity of the glass composition at its liquidus temperature.

The term "liquidus temperatures," as used herein, refers to the highest temperature at which devitrification occurs in the glass composition The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, $Na_2O$ and the like) are given in mole percent (mol. %) on an oxide basis, unless otherwise specified.

The glass-ceramic compositions described herein have properties, such as the liquidus viscosity and the liquidus temperature, which make the glass-ceramic compositions particularly well suited for use with fusion forming processes, such as the fusion down draw process and/or the fusion lamination process. These properties are attributable to the specific compositions of the glasses, as will be described in more detail herein.

In the embodiments of the glass compositions described herein $SiO_2$ is the largest constituent of the composition and, as such, $SiO_2$ is the primary constituent of the glass network formed from the glass-ceramic compositions. Pure $SiO_2$ has a relatively low CTE and is alkali free. However, pure $SiO_2$ has an extremely high melting point. Accordingly, if the concentration of $SiO_2$ in the glass compositions described herein is too high, the formability of the glass composition may be diminished as higher concentrations of $SiO_2$ increase the difficulty of melting the glass which, in turn, adversely impacts the formability of the glass.

The glass compositions described herein also comprise $Al_2O_3$. $Al_2O_3$ serves as a glass network former, similar to $SiO_2$. Like $SiO_2$, $Al_2O_3$ increases the viscosity of the glass composition due to its tetrahedral coordination in a glass melt formed from the glass composition. However, when the concentration of $Al_2O_3$ is balanced against the concentration of $SiO_2$ and the concentration of alkaline earth oxides in the glass composition, $Al_2O_3$ can reduce the liquidus temperature of the glass melt, thereby enhancing the liquidus viscosity and improving the compatibility of the glass composition with certain forming processes such as the fusion forming process.

In the embodiments described herein, the concentration of $Al_2O_3$ in the glass compositions is generally less than or equal to about 20 mol. % in order to achieve compositions having the desired liquidus temperature. For example, in some embodiments, the concentration of $Al_2O_3$ in the glass compositions is greater than or equal to about 10 mol. % and less than or equal to about 16 mol. %.

The glass compositions described herein may optionally comprise one or more fining agents. The fining agents may comprise, for example, $SnO_2$, $As_2O_3$, $Sb_2O_3$ and combinations thereof. The fining agents may be present in the glass compositions in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

In some embodiments described herein, the glass compositions may further comprise trace amounts of other oxides.

In some embodiments described herein, the glass compositions are substantially free of heavy metals and compounds containing heavy metals. Glass compositions which are substantially free from heavy metals and compounds containing heavy metals may also be referred to as "Super-Green" glass compositions. The term "heavy metals," as used herein, refers to Ba, As, Sb, Cd, and Pb.

The glass-ceramic compositions described herein have a liquidus viscosity which renders them suitable for use in a fusion draw process and, in particular, for use as a glass cladding composition in a fusion laminate process.

While exemplary glass-ceramic compositions have been described hereinabove with reference to specific compositional ranges for various constituent components (such as $SiO_2$, $Al_2O_3$, $Na_2O$, and the like) of each glass-ceramic composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass-ceramic compositions described herein in order to produce a glass having the desired properties.

Referring now to FIG. 1, the glass compositions described herein may be used to form an article, such as the laminated glass article 100 schematically depicted in cross section in FIG. 1. The laminated glass article 100 generally comprises a glass core layer 102 and a pair of glass cladding layers 104a, 104b. The glass-ceramic compositions described herein are particularly well suited for use as the glass claddings layers, as will be discussed in more detail herein.

FIG. 1 illustrates the glass core layer 102 shown comprising a first surface 103a and a second surface 103b which is opposed to the first surface 103a. A first glass cladding layer 104a is fused directly to the first surface 103a of the glass core layer 102 and a second glass cladding layer 104b is fused directly to the second surface 103b of the glass core layer 102. Post-ceramming, the glass cladding layers 104a, 104b are fused to the glass core layer 102 without any additional materials, such as adhesives, polymer layers, coating layers or the like, being disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both.

In at least some of the embodiments of the laminated glass article 100 described herein, the glass cladding layers 104a, 104b are formed from a first glass-ceramic composition having an average cladding coefficient of thermal expansion $CTE_{clad}$ and the glass core layer 102 is formed from a second, different glass composition which has an average coefficient of thermal expansion $CTE_{core}$.

Figure 2:
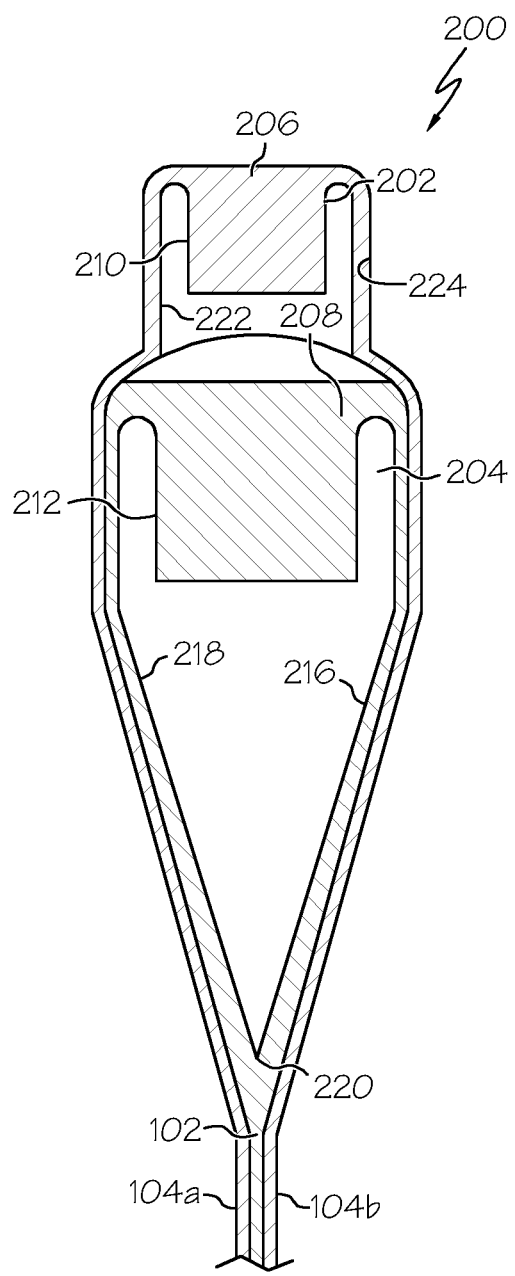
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article comprises an upper isopipe 202 which is positioned over a lower isopipe 204. The upper isopipe 202 comprises a trough 210 into which a molten glass cladding composition 206 is fed from a melter (not shown). Similarly, the lower isopipe 204 comprises a trough 212 into which a molten glass core composition 208 is fed from a melter (not shown). In the embodiments described herein, the molten glass core composition 208 has an appropriately high liquidus viscosity to be run over the lower isopipe 204.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass structure.

Simultaneously, the molten glass-ceramic cladding compositions 206 overflows the trough 210 formed in the upper isopipe 202 and flows over outer forming surfaces 222, 224 of the upper isopipe 202. The molten glass-ceramic cladding composition 206 has a lower liquidus viscosity requirement to be run on the upper isopipe 202, and will have a CTE either equal to or less than the glass core composition 208 (for example, within about $5\times10^{-7}$) when present as a glass. The molten glass-ceramic cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming pre-cerammed glass cladding layers 104a, 104b around the glass core layer 102.

In some embodiments, in the laminated sheet so formed, the clad thickness will also be significantly thinner than the core glass thickness so that the clad goes into compression and the core into tension. But as the CTE difference is low, the magnitude of the tensile stress in the core will be very low (e.g on the order of 10 MPa or lower) which will allow for the production of a laminated sheet that will be relatively easy to cut off the draw due to its low levels of core tension. Sheets can thus be cut from the laminate structure that is drawn from the fusion draw apparatus, and after the sheets are cut, the cut product can then be subjected to a suitable ceramming process that will ceram the clad layers to appropriate depths and extents. The ceramming can be done either just by heating the laminate structure to an appropriate temperature, or by ion exchanging the clad at appropriate high temperatures. The glass-ceramic composition on the clad will then have a significantly lower CTE than the core and, after cool down, will develop significantly higher compressive stress. That is, the clad is comprised of a glass-ceramic composition that is cerammable to a lower CTE than the core. Thus, this process can reduce difficulties with cutting highly stressed laminate products on the draw tower. The process provides high compressive stress products without issues associated with cutting at or on the draw tower by separating the steps of forming the laminate structure and subsequently creating the appropriate levels of stress in desired parts of the structure, because of the glass-ceramic composition of the clad.

While specific glass-ceramic compositions for use as the glass cladding layers 104a, 104b have been described herein, it should be understood that any of the glass-ceramic compositions described herein may be used to form the glass cladding layers 104a, 104b of the laminated glass article 100.

EXAMPLES

The various embodiments of the glass compositions described herein will be further clarified by the following examples.

Table 1 lists the compositions of inventive glass-ceramic compositions (i.e., Examples 1-6).

TABLE 1

Exemplary Glass-Ceramic Compositions

| Oxide (mol %) | 1 | 2 | 3 | 4 | 5 | 6 |
|---|---|---|---|---|---|---|
| $SiO_2$ | 64.48 | 71.49 | 69.39 | 64.48 | 71.49 | 69.39 |
| $Al_2O_3$ | 15.74 | 12.98 | 14.06 | 15.13 | 11.94 | 12.70 |
| $Na_2O$ | 12.02 | 5.34 | 4.67 | 12.02 | 5.34 | 4.67 |
| $Li_2O$ | 2.49 | 5.56 | 6.67 | 2.49 | 5.56 | 6.67 |
| $Ti_2O$ | 5.26 | 4.63 | 5.22 | 5.26 | 4.63 | 5.22 |
| CaO | | | | | | |
| SrO | | | | | | |
| MgO | | | | 0.62 | 1.04 | 1.35 |

The laminated glass articles disclosed herein may be employed in a variety of consumer electronic devices including, without limitation, mobile telephones, personal music players, tablet computers, LCD and LED displays, automated teller machines and the like.

In some embodiments, the laminated glass article may comprises one or more layers which are opaque, transparent or translucent, such as a clad derived from a glass-ceramic composition wherein the clad layer is opaque, transparent or translucent after ceramming. Furthermore, the use of glass-ceramics in sheet form can be utilized.

Further, while specific reference has been made herein to the use of the glass compositions as cladding layers of a laminated glass article, it should be understood that the glass compositions may also be used to independently form glass articles (i.e., non-laminated glass articles), such as, for example, cover glasses for electronic devices, backplane glasses for display devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article comprising:
   a glass core layer disposed between a first glass cladding layer and a second glass cladding layer;
   wherein the glass core layer has a composition which is different from the composition of the first and second glass layers;
   wherein the first glass cladding layer and the second glass cladding layer are formed from a glass-ceramic composition comprising:
     from about 60 mol. % to less than 72.0 mol. % $SiO_2$;
     from about 10 mol. % to about 17 mol. % $Al_2O_3$;
     from about 3 mol. % to about 15 mol. % $Na_2O$;
     from about 1 mol. % to about 8 mol. % $Li_2O$; and
     from about 3 mol. % to about 7 mol. % $TiO_2$; and
   wherein a net CTE difference between at least one of the first and second glass cladding layers, and the glass core layer, is from about $20 \times 10^{-7}$/C to $62 \times 7 \times 10^{-7/C}$.

2. The glass article of claim 1, wherein the first glass cladding layer and the second glass cladding layer comprise:
   from about 64 mol. % to less than 72.0 mol. % $SiO_2$;
   from about 11 mol. % to about 16 mol. % $Al_2O_3$;
   from about 4 mol. % to about 13 mol. % $Na_2O$;
   from about 2 mol. % to about 7 mol. % $Li_2O$; and
   from about 4 mol. % to about 6 mol. % $TiO_2$.

3. The glass article of claim 1, wherein the first and second glass cladding layers have a coefficient of thermal expansion of from about $5 \times 10^{-7}$/C to about $25 \times 10^{-7}$/C.

4. The glass article of claim 1, wherein the first and second glass cladding layers have a coefficient of thermal expansion of from about $10 \times 10^{-7}$/C to about $20 \times 10^{-7}$/C.

5. The glass article of claim 1, wherein:
   a first surface of the glass core layer is directly adjacent the first glass cladding layer; and
   wherein a second surface of the glass core layer is directly adjacent the second glass cladding layer.

6. The glass article of claim 1, wherein the first glass cladding layer and the second glass cladding layer are compressively stressed.

7. The glass article of claim 1, wherein the first glass cladding layer and the second glass cladding layer further comprise an alkaline earth oxide.

8. A use of the glass article of claim 1 for cover glass or glass backplane applications in consumer or commercial electronic devices, for touch screen or touch sensor applications, for portable electronic devices, for photovoltaic applications, for architectural glass applications, for automotive or vehicular glass applications, or for commercial or household appliance applications.

* * * * *

UNITED STATES PATENT AND TRADEMARK OFFICE
CERTIFICATE OF CORRECTION

PATENT NO. : 10,570,055 B2
APPLICATION NO. : 16/273867
DATED : February 25, 2020
INVENTOR(S) : Heather Debra Boek et al.

It is certified that error appears in the above-identified patent and that said Letters Patent is hereby corrected as shown below:

On the Title Page

On page 2, Column 2, item (56), other publications, Line 38, delete "Negate et al." and insert -- Nagate et al. --, therefor.

In the Claims

In Column 8, Line 30 approx., Claim 1, delete "$62 \times 7 \times 10^{-7/C.}$" and insert -- $62 \times 10^{-7}/C.$ --, therefor.

Signed and Sealed this
Nineteenth Day of May, 2020

Andrei Iancu
*Director of the United States Patent and Trademark Office*